Feb. 4, 1958 J. MONOD 2,822,319
METHODS FOR THE CULTIVATION OF MICRO-ORGANISMS
Filed Aug. 17, 1954
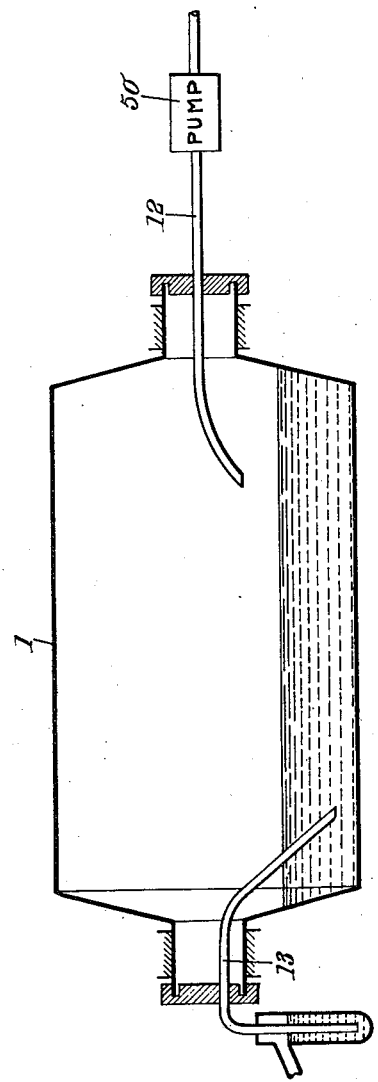

United States Patent Office 2,822,319
Patented Feb. 4, 1958

2,822,319

METHODS FOR THE CULTIVATION OF MICRO-ORGANISMS

Jacques Monod, Paris, France

Application August 17, 1954, Serial No. 450,308

2 Claims. (Cl. 195—115)

The present invention relates to methods for the cultivation of microorganisms, its object being to achieve a self-stabilizing continuous production of the desired organism, with an adjustable output and a high yield, while maintaining constancy and homogeneity of the characteristics of the product, and providing the possibility of influencing and controlling the composition and properties of the cellular and other material, formed as a result of growth.

The essential idea of my method (and that which distinguishes it from any method previously employed in the laboratory or in industry for the cultivation of microorganisms) is to set up the culture as a permanent steady-state system in which the growth rate of the organisms is determined, controlled and permanently maintained at a chosen value, through the agency of a specific, chosen, limiting condition.

Figure 1 diagrammatically illustrates a fermenter for carrying out my method. The organisms are grown in fermenter 1 maintained at the desired temperature by appropriate means. New medium is continuously flown into fermenter 1 through pipe 12, at a constant rate, determined by, and adjustable through, any convenient means, of pumping or control such as 50. A volume of culture exactly equivalent to the inflow of new medium, is constantly removed from fermenter 1 through evacuating pipe 13. The volume of culture in fermenter 1 therefore remains constant. It can however, through proper means, be adjusted to any desired value within the limits of the capacity of the fermenter. Means of efficient stirring are provided in fermenter 1 in order that the culture should remain completely homogeneous, i. e. substantially identical in composition throughout its volume, in spite of the continuous addition of new medium. In other words, the formation of a gradient of any sort within the liquid in treatment is avoided, so that any small element of volume within the culture may be considered equivalent to any other element of the same size.

To sum up: the set up may be described as allowing continuous, homogeneous and rate-controlled dilution of the culture by the new medium, with simultaneous collection of spent culture.

In order now to understand the principle involved in the steady-state control of the growth rate with such a system, I will first consider the growth of a population of microorganisms in fermenter 1 when the dilution system is not working.

As it is well known the growth of a population of microorganisms in an adequate nutrient medium, follows an exponential law, expressing the fact that the mean generation time, or its inverse the growth-rate, remains constant, as long as conditions in the medium remain compatible with such constancy. However, as a result of the growth and metabolism of the organisms, the composition and properties of the medium (if it is not renewed) become altered in such a manner that the growth rate must gradually decrease and eventually fall to zero, when the population becomes stationary. The nature of the factor in the medium which thus becomes limiting depends on the composition of the medium and on the properties of the organism. Two classes of limiting factors are to be considered. (1) The decrease in concentration and eventually the depletion of one essential nutrient source. (2) The increase of concentration of a toxic product of the metabolism. If the composition of a medium could be permanently stabilized, in particular with respect to the limiting factor, growth of the organisms should continue indefinitely, at a rate determined by the constant concentration of the limiting factor. If moreover, the concentration of the limiting factor could be adjusted at will to any value corresponding to a given growth rate, it would be possible to control the growth rate of the organisms. The principle of my method consists in choosing the composition of the medium and the rate of dilution of the culture in fermenter 1 in such a manner (given the requirements and properties of the organisms) that a steady state is reached with respect to a given limiting factor, the concentration of which determines and controls the growth rate of the organisms.

How this is achieved will become clear when considering a number of concrete examples.

I will take as example the case of the bacterium *Escherichia coli* growing at 37° in a medium of the following approximate composition:

| | Gr. per l. |
|---|---|
| Glucose | 5 |
| Ammonium sulfate | 2 |
| Acid potassium phosphate | 10 |
| Magnesium sulfate | 0.2 |
| Ferrous sulfate | 0.002 |
| Potassium hydroxide, q. s. for pH 7. | |

In this medium and with this organism, the limiting factor is glucose, because all other essential nutrients are in relative excess, with respect to the requirements of the organism, while the strong buffering capacity of the potassium phosphate prevents any significant change in pH. The organisms accordingly grow at a rate corresponding to about 1.2 doublings per hour, as long as the concentration of glucose in the medium does not become very small (below 0.1 gram per liter). If the medium is not renewed, growth stops when all the glucose is exhausted.

It will be supposed that, in a culture growing under these conditions in this medium, the growth is nearing its completion, when already above 95% glucose has been consumed, and the culture approaches the point where the growth rate shall begin to decline, due to the decrease in glucose concentration. The flow system is now started as above set forth, and the rate of dilution is set at a value either slightly or more or less significantly below the rate that would exactly equilibrate the maximal growth rate of 1.2. The concentration of glucose in fermenter 1 will tend to increase, due to the inflow of new medium. In the meantime, the density of organisms in the culture will also increase, since the maximal rate of growth exceeds the rate of dilution of the culture. However, as the mass of the organisms increases in the fermenter, the rate at which they consume glucose also increases, and tends to decrease the concentration of glucose, until this in turn begins to limit the growth rate of the organisms, and therefore to counteract the increased consumption of glucose.

It can be predicted, on the basis of a simple mathematical theory, and it was experimentally verified, that, under these conditions, the system tends toward a steady-state where the concentration of glucose is just that which limits the growth rate of the organisms to the value corresponding to the dilution rate that has been set. Such a steady-state can be indefinitely maintained. Under such steady-state conditions, therefore, the rate of growth of the organisms is in fact controlled and determined by the dilution rate, through the intermediary of the glucose concentration.

The working of such a system and in particular the steady-state condition, can be described in mathematical terms as follows.

Let $x_f$ be the mass of organisms in the fermenter, $x_p$ be the mass of organisms collected as product, $x_t$ the total mass of organisms in the system, such that $$x_t = x_f + x_p$$

deriving with respect to time, I have $$\frac{dx_t}{dt} = \frac{dx_f}{dt} + \frac{dx_p}{dt} \quad (1)$$

The output of the system, i. e. the rate of product collection, is evidently $$\frac{dx_p}{dt} = D x_f \quad (2)$$

where D is the rate of dilution defined as the ratio of the amount of liquid flown through the fermenter per unit of time to the volume of liquid in the fermenter.

The rate of total increase is proportional at any time to the mass of organisms in the culture $x_t$, and to their growth rate.

$$\frac{dx_t}{dt} = \mu x_f \quad (3)$$

where the growth rate, $\mu$, is defined, for convenience, as the number of times the mass of organisms is multiplied by $e(=2.71828)$ per unit of time; combining Equations 1, 2 and 3 gives $$\frac{dx_f}{dt} = x_f(\mu - D)$$

The condition for a steady-state equilibrium to be reached is that D be set at any value which does not exceed the maximal growth rate of the organism considered in the medium considered, at saturating concentrations of the limiting factor. When the equilibrium is reached, $$\frac{dx_f}{dt} = 0 \text{ and } \mu = D$$

With respect to the concentration and consumption of the limiting nutrient factor, I may write (see J. Monod.—Ann. Inst. Pasteur, 79, 1950, 390):

$$\frac{dS}{dt} = D(S_o - S) - \frac{1}{R}\frac{dx_t}{dt}$$

where:

$S$ = concentration of the limiting factor in the fermenter,
$S_o$ = concentration of the limiting factor in the new medium,
$R$ = the yield constant expressing the amount of limiting nutrient consumed in the formation of a unit mass of cells.

In the steady-state, the consumption of limiting nutrient, and the production of the system is given by the formula:

$$\frac{dx_p}{dt} = RD(S_o - S)$$

Moreover, it is an experimental fact that in general S is negligible by comparison with $S_o$. In other words, the limiting nutrient is, for all practical purposes, entirely consumed.

For instance, in the case of E.coli growing in a medium where glucose (5 gr./liter) is the limiting factor, it is found that the system can easily be stabilized and indefinitely maintained at any dilution rate from zero to 0.8 or 0.9 with a steady production of about 0.3 gram dry weight of organisms per gram of glucose flown into the fermenter.

I will now describe a detailed example of an actual experimental run made by me and in which the organism used was E.coli, strain "ML," the medium that above described, the fermenter of the type described in my U. S. patent application Ser. No. 270,125 for "Apparatus for the Cultivation of Microorganisms," filed February 6, 1952.

The sterilized fermenter was filled with 50 liters of sterile medium, and the temperature brought to 37° C. The fermenter was inoculated with 500 milliliters of a batch culture of E.coli (strain ML), grown on the same medium. The density of the culture was followed turbidimetrically, using a photoelectric densitometer. In addition, viable counts and determinations of dry bacterial mass were run at intervals on small samples of the culture. Glucose determinations were also run at intervals on supernatants of the centrifuged culture samples.

The culture was first allowed to grow without dilution of the medium. After a short lag period of about ½ hour (inoculation time being taken as zero time), the density of the culture increased exponentially at a rate corresponding to a mean generation time of about 50 minutes. Five and a half hours after inoculation, the culture had reached a density of about $5 \times 10^9$ cells per milliliter and contained about 1.4 grams dry weight bacterial substance per liter.

At this time, the continuous dilution system was started at a rate of 40 liters per hour. The dilution rate (D) as defined above was therefore $$\frac{40}{50} = 0.8$$

The density of the culture thereafter continued to increase very slowly in the fermenter for about three hours. It stopped increasing at the ninth hour after inoculation and thereafter remained completely stable (within the limits of sensitivity of the optical density measurement, i. e. ±2 or 3 percent), through the run, which was continued for one week. Repeated determinations of bacterial mass, and of glucose were made during this period on samples taken from the culture. The bacterial mass per unit of volume remained stable at 1.5 gram dry weight per liter. Only a trace of glucose (less than 100 μg. per milliliter) was present, showing that virtually all the glucose was effectively used for growth. Moreover, the size and shape of the cells, as examined with the microscope remained quite constant, and characteristic of so-called "young" viable cells, while the pH of the culture remained also perfectly constant (although it was not independently or especially controlled). The production amounted to about 1.000 liter of fully-grown culture liquid and to 1.5 kg. of dry bacterial mass per day.

It will be readily understood that the same functional principles apply when the limiting factor is not the source of carbon, but another essential nutrient source. As a further example I may state the case of E. coli growing in a medium of the same qualitative composition as above, but in which the ammonium sulfate concentration is only 1 gr. per liter while the glucose concentration is raised above 6 gr. per liter. In this medium, it is the nitrogen supply which becomes limiting, and it is the concentration of ($NH_4$) which controls the growth-rate in the steady-state condition. The production can be stabilized in the steady state up to dilution rates of 0.8 or 0.9 and the production amounts to 2 grams dry weight of organisms, per gram of ammonium sulfate flown into the fermenter.

Similarly, by adequate alterations of the composition of the medium, any essential nutrient may be used as limiting factor, and in the case of organisms which require special growth-factors or vitamins, such special requirement may be used for the establishment of a steady state and for the control of the growth rate.

For instance a strain of *Bacillus subtilis* which requires methionine for growth can be grown and stabilized in a continuous dilution system in a medium of the same composition as the one given above and containing in addition 10 mg. of methionine per liter. The limiting factor here is methionine, and when the dilution rate is set at a value not exceeding the maximal growth rate, a steady state is eventually established where the concentration of methionine in the fermenter controls the growth rate at the value corresponding to the chosen dilution rate.

As stated above, the principle involved in the establishment of a steady-state continuous dilution culture system where the growth rate is controlled by the dilution rate, is also applicable when the factor controlling growth is not the exhaustion of an essential nutrient, but the accumulation of a product of metabolism. Such a product may for instance be the acid or alternatively the alkali equivalents liberated as a result of metabolism.

As an example, suppose the first medium given above is modified by cutting the phosphate concentration down to 1 gr. per liter. The metabolism of glucose on the one hand, and the consumption of $(NH_4)^+$ ions on the other, liberate acid equivalents and tend to acidify this relatively unbuffered medium. Under these conditions the growth of *E. coli* in this medium is not limited by the exhaustion of a nutrient source, but by the acidification of the medium. This limiting factor can then be used to establish a steady state and control the growth rate, by setting the rate of dilution at any convenient value not exceeding the maximal rate of growth of the organism at the pH of the new medium. Similarly by growing microorganisms in a medium where their metabolism tends to accumulate alkali equivalents, steady-state systems can be established where alkali is the controlling limiting factor. Such is the case for instance when e. g. yeast is grown in a medium where an organic acid e. g. succinic acid is the main or only source of carbon. Other products of metabolism can similarly be used as controlling factors in steady-state culture systems established in accordance with the principle of my method. For instance again, in anaerobic cultures of yeast, alcohol can be used as the controlling factor, allowing the establishment of permanent, steady-state anaerobic cultures, growing at constant rate, in a constant concentration of alcohol.

The range of applicability of my method is therefore extremely wide, since it can be used with any microorganism which can be grown as a homogeneous suspension, and since a wide variety of limiting conditions can be used for control of the steady state, depending on the properties of the organism, and on the type of production required.

Actually, and only as examples, the following organisms have been grown according to my method.

Bacteria: *Escherichia coli, Bacillus subtilis, Bacillus megaterium, Corynebacterium diphtheriae, Clostridium welchii, Clostridium botulinum, Streptococcus lactis*, etc., etc.

Yeasts: *Saccharomyces cerevisiae, Saccharomyces fragilis, Torulopsis utilis*, etc.

Moulds: *Ophiostoma*.

Protozoa: *Chlamydomonas sp., Euglena sp., Polytomella sp.*

One of the main advantages of my method is the continuity and stability of the production. It is obvious that in the steady-state not only is the concentration of the limiting factor constant, but also that of all other factors, components or nutrients in the medium. Complete stability in all respects is therefore obtained without any controls and adjustments as usually performed in the conventional methods. This in turn insures stability of the properties of the product, one of the most desirable and also one of the most difficult results to be obtained in biological productions.

Another conspicuous advantage is the maximal utilization of fermenter capacity. In all other methods of cultivation, whether continuous or not, the density of organisms in the culture varies, either in space, or time, or both. With the present system, where growth takes place in a single homogeneous phase, the density of organisms throughout the fermenting volume remains constant and maximal, insuring therefore a maximal output, since the instantaneous output of any system is always proportional to the mass of organisms in treatment.

Another particularly significant and quite unique advantage of the method, is the fact that by an adequate choice of the limiting factor and of the growth rate, the physiology and biochemistry of the organisms can be influenced to a very remarkable extent. As an example, bacteria or yeasts grown according to my method, with glucose (or other carbohydrate) as limiting factor in the steady state, tend to synthesize relatively less polysaccharide and more protein than the same organisms grown in a medium where the source of nitrogen is the controlling factor. Moreover, the relative composition of the organisms depends to a very significant extent on the growth-rate which is imposed upon them.

Similarly, it is well known that the physiology and biochemistry of microorganisms, and the type of products which they synthesize as they grow depends on the pH of the medium. My method affords the possibility of setting up cultures in which the pH will spontaneously be stabilized at a desired value, determined once and for all as corresponding to a given dilution-rate in a given medium.

It should be noted that in all that precedes, it has been assumed, for the sake of simplicity and clarity, that the various components of the medium were always added as a single mixture, through a single pipe, into fermenter 1. In actual practice, it may be convenient to add separately, through separate pipes, certain of the components. This does not in any way alter the principle of the method. It should also be pointed out that the method is equally applicable to aerobic and anaerobic organisms, provided the culture in fermenter 1 is maintained in proper equilibrium with the proper gas phase.

The present application is a continuation-in-part of my application Ser. No. 197,867, filed November 28, 1950.

What I claim is:

1. The method of growing microorganisms in continuous culture and of controlling their growth rate, which comprises continuously and simultaneously adding fresh medium at a constant volumetric rate to, and removing culture in liquid state at the same rate from, a fermenter, while mixing and stirring said culture to keep it homogeneous with respect to all biological and chemical characteristics in the totality of its volume, the rate at which components of the medium are added being chosen such that the opposed effects of the addition of medium components on the one hand and the influence on a growth controlling factor by the consumption of said components by the microorganisms on the other hand create a steady-state where the rate of multiplication of the microorganisms is actually limited and controlled to remain constant, in all parts of the culture simultaneously and at all times, by said rate of addition of medium components.

2. The method of controlling the growth in a microorganism culture which comprises actively stirring and mixing the culture to maintain it substantially homogeneous whereby each portion of the total volume thereof has substantially the same chemical and biological composition, and simultaneously adding nutrient to the culture and removing culture therefrom at the same constant volumetric rate, the ratio of nutrient medium added per unit of time to total volume of culture being chosen such that the growth rate of microorganisms throughout the culture is maintained at a constant value due to the quantity of a given ingredient contained in the added nutrient medium being such that it is supplied at a rate less than the maximum potential consumption by the microorganisms.

References Cited in the file of this patent

UNITED STATES PATENTS

| | | |
|---|---|---|
| 1,624,674 | Pollak | Apr. 12, 1927 |
| 1,884,272 | Sak | Oct. 25, 1932 |
| 1,891,841 | Sak | Dec. 20, 1932 |
| 2,063,223 | Boinot et al. | Dec. 8, 1936 |
| 2,083,347 | Scholler et al. | June 8, 1937 |
| 2,295,150 | Arroyo | Sept. 8, 1942 |

FOREIGN PATENTS

| | | |
|---|---|---|
| 346,361 | Great Britain | Apr. 17, 1931 |
| 704,872 | Great Britain | Mar. 3, 1954 |

OTHER REFERENCES

De Becze et al.: Continuous Fermentation, Am. Brewer, February 1943, pp. 11–16 and 30–34.